United States Patent [19]

Gamson et al.

[11] Patent Number: 4,555,475

[45] Date of Patent: Nov. 26, 1985

[54] METHOD OF MAKING A PLANOGRAPHIC PRINTING MEMBER WITH ALUMINIUM SILICATE

[75] Inventors: Alan R. Gamson; Phillip R. Kellner, both of London, England

[73] Assignee: Crossfield Electronic Limited, London, England

[21] Appl. No.: 531,896

[22] PCT Filed: Jan. 14, 1983

[86] PCT No.: PCT/GB83/00003

§ 371 Date: Aug. 29, 1983

§ 102(e) Date: Aug. 29, 1983

[87] PCT Pub. No.: WO83/02505

PCT Pub. Date: Jul. 21, 1983

[30] Foreign Application Priority Data

Jan. 15, 1982 [GB] United Kingdom ................. 8201171

Jan. 15, 1982 [GB] United Kingdom ................. 8201168

[51] Int. Cl.⁴ ................................................ G06F 7/00

[52] U.S. Cl. .................................... 430/309; 430/272; 430/278; 430/302; 430/300; 430/945

[58] Field of Search ............... 430/309, 311, 272, 278, 430/300, 302, 576, 945

[56] References Cited

U.S. PATENT DOCUMENTS

| | | | |
|---|---|---|---|
| 3,210,184 | 10/1965 | Uhlig | 96/1 |
| 3,747,117 | 7/1973 | Fechter | 346/135 |
| 4,034,183 | 7/1977 | Uhlig | 219/122 |
| 4,054,094 | 10/1977 | Caddell et al. | 101/467 |
| 4,063,949 | 12/1977 | Uhlig et al. | 96/27 E |
| 4,266,066 | 5/1981 | Uhlig et al. | 430/300 |
| 4,411,983 | 10/1983 | Washiza et al. | 430/309 |
| 4,414,315 | 11/1983 | Gracia et al. | 430/309 |

FOREIGN PATENT DOCUMENTS 0030774 6/1981 European Pat. Off. .

*Primary Examiner*—Jack P. Brammer

*Attorney, Agent, or Firm*—Sughrue, Mion, Zinn, Macpeak, and Seas

[57] ABSTRACT

Imagewise differential oleophilicity is formed on a planographic printing member by imagewise photoexposure, generally with a Yag laser, of an aluminium silicate image forming layer, generally of a boehmite hydrate layer such as is formed by contact of anodized or other aluminium substrate with sodium silicate. A print resistant image may be formed by applying to an image surface having imagewise differential oleophilicity a selective coating composition comprising an organic phase, generally in an amount of 90 to 75% by volume, containing film forming resin and that will preferentially wet and deposit resin on the image areas, and an aqueous phase, generally in an amount of 10 to 25% by volume, that will preferentially wet and prevent resin deposition on the background areas, and hardening the resin. Novel selective coating compositions for this purpose include emulsions of 10 to 25% by volume aqueous phase and 90 to 75% by volume of a solution of epoxy or other suitable resin in cyclohexanone or a blend of cyclohexanone and ethylene chloride.

13 Claims, No Drawings

METHOD OF MAKING A PLANOGRAPHIC PRINTING MEMBER WITH ALUMINIUM SILICATE

Planographic printing involves printing from a member on which ink is distributed imagewise solely or primarily as a result of imagewise differences in the surface properties of the member. Thus the surface of the plate may be absolutely level or there may be some trivial imagewise profiling effect, for example as an unavoidable consequence of the generation of the imagewise differential properties.

In lithography, the most common form of planographic printing, imagewise distribution of ink is achieved by applying an oil-based ink to a member which carries an imagewise distribution of relatively oleophilic image areas on a background that is relatively hydrophilic (oleophilic), the hydrophilicity having been enhanced by wetting the background with water.

Planographic printing members can also be used for the production of deep etch plates, in which the differential imagewise surface properties are utilised to produce differential imagewise etching.

Planographic printing members comprise a substrate carrying an image forming layer. The substrate is often of aluminium, usually having an anodised surface. Generally it is provided also with a coating of an aluminium silicate by treating the aluminium, or anodised aluminium, with sodium silicate, for instance as described in U.S. Pat. No. 3,181,461. An image forming layer is applied to the aluminium, anodised aluminium or aluminium silicate. The photosensitive material in this image forming layer may, for instance, be ammonium bichromate or a diazo resin, as described in U.S. Pat. No. 3,181,461, or a photopolymerisable resin. Commercially the image forming layer may be formed immediately prior to use, for instance by wiping on diazo or other photosensitive material just prior to photoexposure, or the printing member may be a presensitised plate having a preformed coating of photopolymerisable resin.

An image is formed on the planographic printing member by imagewise photoexposure of the image forming layer. The exposure is usually conducted using ultraviolet radiation. It results in imagewise changes in the properties of the image forming layer, for instance with the exposed areas being hardened as a result of exposure. The exposed image forming layer is then developed. Development normally involves removal of the unexposed image forming layer, to reveal the relatively hydrophilic silicate or anodised aluminium substrate. Additionally development may involve strengthening the exposed image, for instance by coupling a resin onto the exposed image forming material to give an imagewise deposition of resin bonded to the substrate. Typical developer compositions comprise a large amount of water, to remove the unexposed image forming layer, and a small amount of an organic phase carrying the resin and other additives such as pigment. It is necessary that the amount of organic solvent should be relatively low as otherwise the solvent in the developer would strip the exposed areas off the substrate.

These systems all suffer from the disadvantage that it is necessary to provide photosensitive coating over the anodised, and often silicated, aluminium substrate, and the cost of this is usually quite considerable relative to the cost of the substrate.

Various detailed modifications of these general methods have been proposed in the literature. For instance in U.S. Pat. No. 4,054,094 it is proposed to expose imagewise by a laser a printing member comprising an aluminium substrate carrying a polymeric composition that is coated by polysilicic acid. Thus this method requires two coating steps over the substrate. The imagewise exposure results in decomposition of the organic resin so as to render the exposed areas oleophilic, while the polysilicic acid in the unexposed areas renders the surface hydrophilic. It is stated that when the polysilicic acid is applied directly to the aluminium plate imagewise exposure by the laser does not transform the surface from a water accepting to a water rejecting surface. Although it is stated in U.S. Pat. No. 4,054,094 that almost any solid state, liquid or gaseous laser can be used the $CO_2$ laser is said to be particularly suitable.

More recently a system has been developed in which a sheet carrying transferable material on its surface is laid against a suitable substrate, such as anodised aluminium, and is then scanned imagewise by a laser so as to transfer the transferable material imagewise onto the substrate. For instance the sheet may carry a coating of graphite bonded by a cellulose binder and the binder and graphite are transferred, in those areas struck by the laser beam, onto the substrate to form relatively oleophilic areas. The differential properties are unstable but they can be stabilised by baking the sheet in an oven followed by treatment with an appropriate developer. This method therefore has the advantage of avoiding the use of photosensitive coatings but it has the disadvantage of requiring a transfer sheet and the provision of facilities for baking the substrate.

It has been our object to provide planographic printing members, and methods of using them, that avoid the various disadvantages discussed above.

In the invention an image is formed on a planographic printing member having an image forming layer by imagewise photoexposure of the image forming layer, the method being characterised in that the image forming layer includes an aluminium silicate as image forming material and the imagewise photoexposure converts the aluminium silicate to a more oleophilic form.

Accordingly the exposed printing member then has an imaged surface comprising an imagewise distribution of relatively oleophilic material against a background of relatively hydrophilic material. The differences in oleophilicity may be rather low for direct use for printing and so it is necessary to increase the differences in oleophilicity between the image and background areas. This can be achieved by applying a selective coating composition comprising an organic phase that includes a film forming oleophilic resin and that preferentially wets and deposits resin on the relatively oleophilic image areas and an aqueous phase that preferentially wets and prevents resin deposition on the unexposed, relatively hydrophilic, background areas, and then hardening the deposited resin.

The exposure step is thus distinguished from conventional planographic exposure steps by the fact that aluminium silicate is used as image forming material. Additional image forming material, such as bichromate, diazo resin or photopolymerisable resin is unnecessary and the aluminium silicate is generally the only image forming material on the printing member. The method also differs from conventional planographic methods in that differential imagewise oleophilicity follows directly from the exposure, and exists even before any development or coating treatment. The method also differs from conventional planographic methods in that whereas they achieve development by the essential step of removing the background areas to expose the underlying substrate in the invention it is essential that there should be substantially no removal of components of the image forming layer but that instead differential oleophilicity may be increased by differential coating of an oleophilic resin in the exposed areas.

The planographic printing member comprises a substrate carrying the image forming layer and generally is in the form of a plate. The substrate may be any substrate that is sufficiently smooth for use in forming a planographic printing member and that is capable of carrying the coating of aluminium silicate It may therefore be, for example, paper carrying an appropriate coating. Preferably however the aluminium silicate is in or on an aluminium surface. Thus the substrate may be an aluminised substrate, such as paper, but preferably is an aluminium sheet. The aluminium surface may be porous and the aluminium silicate may be in the pores of the coating. Alternatively the aluminium silicate may be solely above the aluminium surface. Preferably the aluminium silicate is formed on or is coated onto an anodised aluminium surface.

It is common practice to form an aluminium silicate coating on an anodised aluminium plate or other surface prior to application of conventional presensitised or wipe-on photosensitive coating, and the resultant aluminium silicate coatings are often suitable for use as the image forming layer in the invention. Thus the printing members used in the invention are preferably obtained by a process comprising treating an aluminium surface, generally an anodised aluminium surface, with an alkali silicate solution, for instance as described in U.S. Pat. No. 3,181,461. Normally the alkali silicate solution is of an alkali metal silicate, generally sodium silicate.

Because the imagewise differential oleophilicity after exposure is relatively low the imagewise differential print density, obtained when printing from the exposed surface, is also likely to be rather low if the surface is not treated by the selective coating composition before application of the ink. However even this low difference will be suitable for some purposes. The application of the selective coating composition increases the differential print density that is obtainable but the precise difference in print density between image areas and background areas depends on a wide range of factors including the particular ink being used, the nature of the selective coating composition, the nature of the exposure, and the composition of the original image forming layer. The coating composition preferably is standardised to be suitable for a range of exposed surfaces and inks, for instance by adjusting the relative proportions of solvent phase and aqueous phase, as discussed below. However if this is done and if the exposed image forming layer is of varying quality it follows that there is a risk that the differential print density will vary according to variations in the exposed image forming layer. It is therefore desirable to standardise the properties of the exposed image forming layer as much as possible and, in particular, to standardise the chemical composition of the image forming layer before exposure. It seems that the precise composition of the aluminium silicate formed by contact of aluminium, generally anodised aluminium, with alkali silicate may vary from batch to batch, probably depending upon processing conditions, unless care is taken. It is therefore desirable that the processing conditions and the resultant layer should be standardised to give uniform and optimum properties since this facilitates formulating appropriate selective coating compositions and inks.

It is generally preferred that the coating weight of aluminium silicate on the printing members should be heavier than the weight traditionally provided on such plates. Thus typically in conventional systems the dry weight of the aluminium silicate is around 1 to 1.5 $mgs/m^2$ but in the invention the dry weight of the aluminium silicate in the image forming layer is generally 2 to 8, preferably 2 to 5, $mgs/m^2$.

The printing member is generally made by contacting a substrate that is formed of aluminium or has a coating including or formed of aluminium with a solution that will provide the aluminium silicate on the surface, this solution preferably being an alkali metal silicate solution and the substrate preferably being an anodised aluminium plate. The concentration of the silicate solution may be from 20 to 40% by weight and its temperature during contact may be from 80° to 100° C. Contact may be by immersion or swabbing or any other convenient manner and contact of the surface with excess solution is preferably maintained for from 5 to 15 minutes, whereafter excess solution may be rinsed with water and the surface then dried. Alternatively excess solution may be dried on the surface.

Since the exposure results in imagewise differential oleophilicity it is of course essential that the printing member should, before exposure, have an image forming layer of uniform oleophilicity. Accordingly it is necessary to avoid depositing on the layer material that will render its oleophilicity non-uniform. For instance it is essential that the image forming layer is not touched by hand as this might deposit grease on the layer.

The image forming layer is then subjected to imagewise photoexposure and the exposure conditions must be selected so as to give the desired imagewise change in oleophilic properties. For this purpose it is generally found that intense infrared radiation is required. It seems that the effect is a photochemical effect and not a heating effect and so the optimum wavelength will probably depend upon the particular form of aluminium silicate that is in the coating. For instance although wavelengths up to 12 microns may be suitable with some aluminium silicates the aluminium silicates that we have used are most effectively imaged at wavelengths in the range 0.8 to 4$\mu$, with best results being obtained at around 1.06$\mu$.

The irradiation must be sufficiently intense that it causes the change in properties. The intensity may be achieved either by having a relatively low level of irradiation over a long period or a much higher level of irradiation over a short period. Prolonged irradiation may produce over-heating of the substrate and this may be undesirable. It is generally therefore preferred to irradiate at a high level of radiation for a short period. One suitable method of imagewise irradiation is to perform flash exposure through a mask image. The preferred method of irradiation is by imagewise laser exposure using an infrared laser of the chosen wavelength, and in particular we find that the infrared Yag laser is, out of all the commercially available lasers, the type of laser which gives best results.

The laser generally irradiates each exposed part of the coating for 0.3 to 7, preferably 1 to 2,$\times 10^{-6}$ seconds. The power of the laser is typically from 4 to 30, preferably 9 to 14, watts, giving a coating sensitivity typically of from 30 to 300, preferably 70 to 150, millijoules per square cm.

It is not entirely clear to us what chemical effect is being achieved during the imagewise photoexposure. It seems probable that the aluminium silicate is initially present as aluminium silicate hydrate and that the irradiation changes the aluminium silicate hydrate to a more oleophilic chemical form. This modification may result from a change in the crystal structure of the hydrate but probably the more important mechanism involves conversion of the aluminium silicate from a more hydrated form to a less hydrated form, optionally accompanied by changes in crystal structure. It seems that best results are obtained when the aluminium silicate coating is initially present as aluminium silicate heptahydrate and that the irradiation may be converting the heptahydrate to the corresponding pentahydrate, this pentahydrate being more oleophilic than the heptahydrate.

In order that the optimum imagewise differential oleophilicity should be obtained, especially when exposure is by a laser, it is preferred that the image forming layer should be formed predominantly or wholly of a single form of aluminium silcate that will be imaged by the chosen wavelength and preferably the aluminium silicate in the image forming layer is predominantly or wholly of boehmite, preferably initially in the form of boehmite heptahydrate.

Systems for imagewise laser scanning are commercially available, for instance under the trade name Logescan. They involve the imagewise generation of pulses of irradiation that strike the surface only in those areas that are to be exposed. Description of suitable imagewise laser scanning methods is to be found in, for example U.S. Pat. Nos. 3,945,318 and 3,739,088.

The invention includes also methods of forming a planographic printing surface having a print resistant image by applying a selective coating composition to an image surface, these methods being characterised in that the image surface comprises an imagewise distribution of relatively oleophilic material against a background of relatively hydrophilic material and the selective coating composition comprises an organic phase that includes a film forming oleophilic resin and that preferentially wets and deposits resin on the image areas and an aqueous phase that preferentially wets and prevents resin deposition on the background areas, and then hardening the resin. This process is of particular value when the relatively hydrophilic material is boehmite heptahydrate or other relatively hydrophilic aluminium silicate hydrate, and the relatively oleophilic material is the aluminium silicate derived from that by exposure, for instance as described above. However the method is of value in any situation where it is desired to form a print surface by increasing differential imagewise oleophilicity without removing the hydrophilic areas of the surface. For instance the method can be applied to processes in which it is desired to strengthen imagewise differential oleophilicity obtained by exposure and development of conventional diazo or presensitised plates.

The invention also includes the selective coating compositions suitable for this purpose. The composition is generally an emulsion of from 10 to 25% by volume of the aqueous phase and from 90 to 75% by volume of the organic phase containing the film forming resin. If the amount of the aqueous phase is too low the coating composition will coat resin over the relatively hydrophilic areas as well as over the relatively oleophilic areas. If the amount of aqueous phase is too high the coating composition will tend to prevent resin deposition on the relatively oleophilic areas. It should be noted that the high organic phase content of the composition would render it unsuitable for use as a developer of conventional diazo or presensitised plates since the composition would strip from the plate both the unexposed and the exposed photosensitive material.

Best results seem to be obtained, especially with the described aluminium silicate image layer, when the composition contains 15 to 20% by volume gaseous phase and 80 to 85% by volume organic phase, for instance when the composition is formed of about 1 part by volume aqueous phase and 5 parts by volume organic phase.

The aqueous phase may consist solely of water or it may have water soluble components added to the water. Thus the aqueous phase may include a hydrophilic film forming material such as a naturally occurring or synthetic polymer such as a hydrophilic gum, preferably gum arabic, or polyacrylic acid. The aqueous phase may also include material that will react with the substrate to improve adhesion of any such film former. For instance it may include an acid such as phosphoric acid or an etchant such as a fluoride, for example ammonium bifluoride.

The organic phase comprises a solution of the film forming resin in an appropriate organic solvent. The solution of resin is preferably a true solution but in some instances it may more accurately be referred to as a dispersion provided it is possible to form an oleophilic film from the solution. The solvent is chosen having regard to the need to form a solution of the resin in the organic phase and having regard to the need to form a stable emulsion or dispersion with the aqueous phase. The solvent preferably comprises an aliphatic ketone, for instance a cycloalkyl ketone having 4 to 8 carbon atoms, most preferably cyclohexanone. This facilitates the formation of a stable coating composition but the preparation of a true solution of the resin in cyclohexanone may be rather difficult. Accordingly it may be desirable to include a powerful solvent for the resin, chlorinated aliphatic hydrocarbons such as ethylene chloride being preferred. The solvent is best formed of 40 to 100% cyclohexanone or other ketone and 60 to 0% ethylene chloride or other chlorinated aliphatic hydrocarbon.

The film forming resin may be any resin that can be adequately dissolved in the organic phase and that will deposit to form an imagewise film having suitable oleophilicity and that has sufficient physical resistance such as scratch resistance, to be suitable for printing and that has sufficient chemical resistance, such as resistance to alcohols, to be suitable for contact with printing inks. The preferred resinous materials are epoxy resins but others that may be used include vinyl resins such as polyvinyl chloride, polyacrylic ester resins, diazo resins, polyester resins, phenol formaldehyde and other resins.

The organic phase generally contains a pigment, so as to highlight the image areas, and may contain other additives. The coating composition may include an emulsifying agent, for example polyethylene glycol, in order to stabilise the emulsion of the aqueous phase and the organic phase but the emulsifying agent must not be such as to significantly promote wetting of the relatively oleophilic areas with the aqueous phase or of the relatively hydrophilic areas with the organic phase.

The composition may be formed by forming the aqueous and organic phases separately and then combining them with vigorous agitation to form an emulsion.

The composition may be applied to the surface by any gentle application system that will allow the selective wetting of the image and background areas, for instance by immersion, sponge or spray. The resin that is preferentially deposited in the oleophilic, image, areas is then hardened, for instance by drying of the composition, optionally after washing it with water. Naturally any such washing must be conducted sufficiently gently that the deposited resin is not washed from the oleophilic areas.

The invention also includes apparatus suitable for carrying out the various method steps and in particular the apparatus may comprise a photoexposure source, means for holding the printing member in a position for photoexposure and means for causing imagewise photoexposure of the member. Preferably the apparatus comprises an infrared laser source, means for holding the printing member in a position to be struck directly by the laser and means for causing the laser to scan the member imagewise. By saying that the printing member may be struck directly by the laser we mean that there is no intervening mask and so the apparatus need not, and preferably does not, contain means for holding a mask to the member during exposure. The means for causing the laser to strike the member imagewise may be electronic means for reading an image and generating imagewise pulses of the laser while it scans the member.

The apparatus may also include means for applying the sensitive coating composition. Thus such means may be an integral part of the apparatus or may be located in close proximity to it and an important advantage of the invention is that the apparatus does not have to include means for baking the coating between exposure and application of the composition.

The invention also includes methods of printing using members produced as described above. Thus an appropriate lithographic ink may be applied to the member and printing may be conducted in a manner that is conventional in lithographic printing.

The following is an example of the invention.

A conventional anodised aluminium lithographic plate is immersed in 30% by weight sodium silicate solution at 90° C. for 10 minutes and is then rinsed and dried. The resultant aluminium silicate hydrate coating has a dry weight of about 3 mgs/m$^2$. Chemical analysis of the surface suggests that the coating consists wholly or mainly of boehmite heptahydrate.

The image to be reproduced is scanned by a neon laser to generate an imput to apparatus, typically as described in U.S. Pat. Nos. 3,739,088 and 3,945,318, that will generate an output signal to control a Yag laser. The Yag laser provides pulses of radiation of wavelength 1.06$\mu$. Each pulse strikes a pixel on the image forming layer about 25 microns diameter for a period, in the exposure areas, of about $1.4\times10^{-6}$ seconds. The power of the laser is about 11 watts and the coating sensitivity of the surface is of the order of 100 millijoules per square cm.

Following the exposure a very faint visible image is apparent. Chemical analysis suggests that in those areas struck by the laser beam boehmite heptahydrate has been converted to boehmite pentahydrate. Experiments readily demonstrate that the areas struck by the laser are more oleophilic than the other areas.

140 Grams of an epoxy resin (for instance a solid epichlorhydrin/bisphenol A resin system such as Epikote 1000) are dissolved in a blend of 500 ml cyclohexanone and 500 ml ethylene chloride. 1 Gram finely divided particulate gravure pigment is dispersed in the organic phase. 5 parts by volume of this organic phase are then mixed with 1 part by volume deionised water with vigorous agitation, to form an emulsion. The emulsion is then applied to the exposed surface by sponge, gently washed with water, and dried. The resultant surface has a strong visible image and corresponding imagewise differential oleophilicity.

The surface may then be inked in conventional manner using a lithoink and used for lithographic printing in conventional manner.

In another example the aqueous phase of the developer may include 5% gum arabic and 1% ammonium bifluoride and the organic phase may contain 4% aluminium stearate and 6% of a 50/50 solution of polyethylene glycol and toluene.

We claim:

1. A method of forming a print resistant image on a planographic printing member comprising an aluminum substrate carrying an image forming layer that consists essentially of an image forming amount of aluminum silicate formed by contacting the substrate with an aqueous metal silicate solution, the method comprising effecting imagewise photoexposure of the image forming layer by infrared laser radiation having a wavelength of 0.8 to 4 microns and thereby forming an oleophilic image in the aluminum silicate layer and then applying a selective coating composition that is an emulsion of an aqueous phase with an organic phase and in which the organic phase includes a film forming oleophilic resin that preferentially wets and is deposited as a film on the oleophilic image areas and the aqueous phase preferentially wets and presents resin deposition on the less oleophilic, non-image areas, and the resin is then hardened to form a film having improved chemical resistance and scratch resistance compared to the oleophilic image in the aluminum silicate layer.

2. A method according to claim 1, wherein the selective coating composition is an emulsion of 15 to 20% by volume aqueous phase and 85 to 80% by volume organic phase containing film forming resin.

3. A method according to claim 1, in which the film forming resin is an epoxy resin.

4. A method according to claim 1, in which the organic phase comprises a solution of the resin in a solvent selected from a ketone and a blend of a ketone with a chlorinated aliphatic hydrocarbon.

5. A method according to claim 1, in which the organic phase comprises a solution of the resin in cyclohexanone or a blend of cyclohexanone with ethylene chloride.

6. A method according to claim 1 in which the image forming layer is formed by contacting an anodized aluminum substrate with an aqueous sodium silicate solution.

7. A method according to claim 1 in which the image forming layer before photoexposure is predominantly or wholly of boehmite heptahydrate.

8. A method according to claim 1 in which the image forming layer consists essentially of 2 to 8 mg/m$^2$ aluminum silicate.

9. A method according to claim 1 in which the laser radiation is effected for 0.3 to $7\times10^{-6}$ seconds, the laser has a power of 4 to 30 watts and the coating sensitivity is 30 to 300 millijoules per sq.cm.

10. A method according to claim 1 in which the emulsion contains from 10 to 25% by volume of the aqueous phase and 90 to 75% by volume of the organic phase.

11. A method according to claim 1 in which the resin is selected from epoxy resins, vinyl resins, polyacrylic ester resins, diazo resins, polyester resins and phenol formaldehyde resins.

12. A method according to claim 1 in which the laser is a Yag laser.

13. A method of forming a print resistant image on a planographic printing member comprising an aluminum substrate carrying an image forming layer that consists essentially of 2 to 8 mg/m$^2$ of aluminum silicate formed by contacting the substrate with an aqueous alkali metal silicate solution, the method comprising effecting imagewise photoexposure of the image forming layer by infrared laser radiation having a wavelength of 0.8 to 4 microns which is effected for 0.3 to $7\times10^{-6}$ seconds by a laser having a power of 4 to 30 watts with a coating sensitivity of 30 to 300 millijoules per sq.cm. and thereby forming an oleophilic image in the aluminum silicate layer and then applying a selective coating composition that is an emulsion of 10 to 25% by volume of an aqueous phase with 90 to 75% by volume of an organic phase and in which the organic phase includes a film forming oleophilic resin that preferentially wets and is deposited as a film on the oleophilic image areas and the aqueous phase preferentially wets and prevents resin deposition on the less oleophilic non-image areas, and the resin is then hardened to form a film having an improved chemical resistance and scratch resistance compared to the oleophilic image in the aluminum silicate layer, wherein the resin is selected from epoxy resins, vinyl resins, polyacrylic ester resins, diazo resins, polyester resins and phenol formaldehyde resins.

* * * * *